United States Patent [19]

Ramakrishnan et al.

[11] Patent Number: 5,418,784
[45] Date of Patent: May 23, 1995

[54] METHOD AND APPARATUS FOR USE IN A NETWORK OF THE ETHERNET TYPE, TO IMPROVE FAIRNESS BY CONTROLLING THE INTERPACKET GAP IN THE EVENT OF CHANNEL CAPTURE

[75] Inventors: Kadangode K. Ramakrishnan, Maynard; Henry S. Yang, Andover; William R. Hawe, Pepperell; Anthony G. Lauck, Wellesley, all of Mass.

[73] Assignee: Digital Equipment Corporation, Maynard, Mass.

[21] Appl. No.: 86,443

[22] Filed: Jun. 30, 1993

[51] Int. Cl.[6] .............................................. H04J 3/14
[52] U.S. Cl. .................................. 370/85.3; 370/85.1; 370/85.2
[58] Field of Search ............... 370/85.3, 85.2, 85.1, 370/94.1, 85.4, 85.5, 85.6, 85.7; 340/825.06, 825.1

[56] References Cited

U.S. PATENT DOCUMENTS

4,707,829  11/1987  Pendse .............................. 370/94.1

OTHER PUBLICATIONS

John Spragins, "Telecommunications Protocols and Designs" pp. 328-331.

*Primary Examiner*—Douglas W. Olms
*Assistant Examiner*—Huy D. Vu
*Attorney, Agent, or Firm*—Kenneth F. Kozik

[57] ABSTRACT

A technique for modifying the IEEE 802.3 standard for selecting transmit-to-transmit interpacket gap (IPG) intervals in a Carrier Sense Multiple Access with Collision Detection (CSMA/CD) network, in the event that a node has captured the network communication channel. If there is a small number of active nodes on the network, one node may capture the channel and the standard backoff algorithm makes it increasingly unlikely for another node to transmit. The new technique provides for less aggressive, i.e. longer, interpacket gap (IPG) intervals to be used by a node that has captured the channel, thereby increasing the likelihood that another node will gain access.

10 Claims, 3 Drawing Sheets

METHOD AND APPARATUS FOR USE IN A NETWORK OF THE ETHERNET TYPE, TO IMPROVE FAIRNESS BY CONTROLLING THE INTERPACKET GAP IN THE EVENT OF CHANNEL CAPTURE

BACKGROUND OF THE INVENTION

This invention relates generally to local area networks (LANs) of the Ethernet type and, more particularly, to techniques for improving fairness of channel access in an Ethernet LAN. Ethernet is a commonly used name for a LAN that uses a network access protocol referred to as Carrier Sense Multiple Access with Collision Detection (CSMA/CD). The CSMA/CD protocol is defined in ANSI/IEEE Std 802.3, published by the Institute of Electrical and Electronics Engineers, Inc., 345 East 45th Street, New York, N.Y. 10017, and referred to in this specification as "the IEEE 802.3 standard." The standard is for a 10 Mbps (megabits/sec) CSMA/CD channel, but it will be understood that the present invention may also be applicable to a 100 Mbps channel.

Under the CSMA/CD rules for access to a network bus or cable, which will be referred to as the channel, any node or station wishing to transmit must first "listen" to make sure that the channel is clear before beginning to transmit. All nodes on the network have equal priority of access and may begin transmitting as soon as the channel is clear and a required inter-packet delay of 9.6 μs (microseconds) has elapsed. However, if a first node that has started transmitting detects a "collision" with a transmission from another node, the first node continues transmitting for a short time to make sure that all nodes wishing to transmit will detect the collision. Every other node detecting the collision also continues to transmit for a short time. Then each node that has detected a collision terminates transmission of the packet or frame. The nodes involved in the collision wait for the required interpacket delay of 9.6 μs and then select random, and therefore usually different, delay times, referred to as backoff times, before trying transmission of the same packet again.

More specifically, the IEEE 802.3 standard defines a collision backoff procedure referred to as "truncated binary exponential backoff." When a transmission attempt has terminated due to a collision, it is retried by the transmitting node, after a selected backoff time, until either the transmission is successful or a maximum number of attempts have been made and all have terminated due to collisions. The backoff time is selected by each node as an integral multiple of the "slot time," which is the maximum round-trip propagation time for the network. i.e. the time to propagate a data packet from one end of the network to the other, and back. The slot time defined by the IEEE 802.3 standard is 51.2 μs. The number of slot times selected as the backoff time before the nth retransmission is chosen as a randomly distributed integer r in the range:

$0 \leq r < 2^k$, where $k = \min(n, 10)$.

Therefore, for the first attempted retransmission the backoff time is selected as 0 or 1 slot times, for the second attempted retransmission the backoff time is selected as 0, 1, 2 or 3 slot times, for the third attempted retransmission the backoff time is selected as 0, 1, 2, 3, 4, 5, 6 or 7 slot times, and so forth. The maximum backoff time, for the tenth attempted retransmission may be up to $2^{10}-1$, or 1,023 slot times, i.e. up to 52.4 ms (milliseconds).

The IEEE 802.3 standard for CSMA/CD operation is designed to achieve optimal performance, in throughput, latency and fairness, when the number of nodes in the network is relatively large. When the number of active nodes, i.e. nodes having data packets to transmit, is small, e.g. two nodes, the IEEE 802.3 standard exhibits an undesirable effect referred to as the capture effect, in which one of the nodes may effectively capture the channel and transmit a succession of data packets in a back-to-back fashion for a relatively long period of time. The capture effect is best understood from a simple example.

Suppose there are two active nodes, A and B, in a network and they begin transmitting at approximately the same time, resulting in a first collision. They each select backoff times of 0 or 1 slot time, in accordance with the standard backoff algorithm. Suppose further that node A selects zero backoff time and node B selects one slot time as its backoff time. Obviously, node A will be able to successfully transmit on its first attempt at retransmission. Node B will wait a full slot time before making its first retransmission attempt, but by this time node A has started transmitting a second data packet, i.e. node A is transmitting successive packets back-to-back, with only the required interpacket gap (IPG) separating them. Node B experiences a second collision on its first data packet, but for node A it is still a "first" collision for trying to transmit a second data packet. In accordance with the standard backoff algorithm, node A selects a backoff of 0 or 1 slot time, but node B selects a backoff of 0, 1, 2 or 3 slot times. Therefore, node B has only one chance in eight of winning access to the channel (if node B chooses 0 and node A chooses 1). Node A, however, has five chances in eight of winning channel access. (Two of the eight possibilities will result in another collision.) Clearly, it is more probable, actually five times more probable, that node A will retain access to the channel, as compared with node B. If the probable occurs, and node A transmits its second data packet, the situation becomes progressively more difficult for node B to transmit. If another collision occurs on node B's next attempt to retransmit, this will be node B's third attempt, but node A's "first" again. Node A's backoff is still 0 or 1 slot time, but node B's is selected from 0 through 7 slot times. Node A is then thirteen times as likely to win access to the channel on the next attempted retransmission. For the nth attempt at retransmission by node B, node A will be $(2^n-3)$ times more likely to win access to the channel. For the maximum value of n, i.e. 10, the unfairness factor between the two active nodes will be $2^{10}-3$, or 1,021.

For network protocols that require a receiving node to acknowledge that it has received a packet, the situation is further aggravated by the need to transmit acknowledgment messages on the network. For example node A captures the channel and is sending successive packets to node B, node B may be unable to acknowledge even the first received packet. Node A will eventually have to give up the channel to allow acknowledgements to flow back from node B, but this is an inefficient process and channel utilization goes down.

It is important to understand the effect of the interpacket gap (IPG) when one node has captured the channel. For example, consider the case in which two nodes (A and B) are contending for the channel before capture may be said to have occurred. (Again, nodes A and B are assumed to have messages to transmit, and to be the only active nodes on the network.) After the first collision, node A selects a backoff time of zero time slots and node B a backoff time of one time slot. Therefore, node A waits just for the IPG interval of 9.6 μs and begins transmitting its first packet again. When node A wins again on its second packet transmission, node A is considered to have captured the channel. Node B waits for its one time slot backoff interval, then checks to see if the channel is idle, but has to wait until node A finishes transmitting a second packet.

The standard rules with regard to IPG intervals are structured such that all nodes must wait for one IPG interval following first sensing channel inactivity at the end of a packet transmission. This applies to node A in the example, which has just finished transmitting a second packet, and to node B, which has sensed that another node has finished transmitting. As soon as the channel becomes idle, node A must observe a "transmit-to-transmit" IPG and node B must observe a "receive-to-transmit" IPG. Both IPG intervals are the same (9.6 μs), so inevitably both nodes will again be contending equally for the channel at the end of the IPG. This equality of node status in the contention is designed to be fair in the situation when many nodes are competing for channel access, but contains an element of unfairness when one of two nodes has captured the channel. As both stations wait for identical intervals of time, the unfairness caused by the backoff algorithm is allowed to persist.

It will be appreciated from the foregoing that there is a need for improvement over the standard approach for selecting random backoff times in a network using the CSMA/CD protocol. Ideally, any improved technique should still comport with the objects of the IEEE 802.3 standard and should be compatible with nodes that use the standard without improvement. The present invention achieves these ends, as will become apparent from the following summary.

SUMMARY OF THE INVENTION

The present invention resides in a technique that modifies the standard use of a uniform interpacket gap (IPG) in the event that a channel capture condition is detected. The basic method of the invention is for use in a node of a network employing a Carrier Sense Multiple Access with Collision Detection (CSMA/CD) protocol to control channel access. The method comprises the steps of sensing when a node has captured the channel by successfully transmitting a first data packet and beginning to transmit a second data packet without relinquishing the channel to another node (i.e. no other node has an intervening successful transmission.) Then, after sensing capture of the channel, the method of the invention further includes selecting an increased transmit-to-transmit interpacket gap (IPG) interval that must be observed before any attempt at transmitting or retransmitting a packet. Therefore, a node that has not captured the channel is given an increased likelihood of being able to transmit before this node. The method further includes the steps of sensing when another node has successfully transmitted a packet and then reverting to use of a standard transmit-to-transmit IPG interval.

More specifically, the step of selecting an increased transmit-to-transmit IPG interval includes selecting a progressively larger interval after each collision experienced following a successful transmission by this channel-capturing node. The step of selecting a progressively larger IPG interval may include increasing the IPG interval in equal steps until a maximum value equal to one slot time is reached, where the slot time is the maximum round-trip signal propagation time for network.

The invention may also be expressed in terms of apparatus, including means for sensing when a node has captured the channel by successfully transmitting a first data packet and beginning to transmit a second data packet without relinquishing the channel to another node; and means operative after sensing capture of the channel, for selecting an increased transmit-to-transmit interpacket gap (IPG) interval that must be observed before any attempt at transmitting or retransmitting a packet.

It will be appreciated from the foregoing that the present invention represents a significant advance in the field of local area networks of the Ethernet or IEEE 802.3 type. In particular, the invention provides an improved procedure wherein the transmit-to-transmit interpacket gap (GAP) interval is selected to be longer than the standard value when a node recognizes that it has captured the network channel. The invention improves fairness of channel access in networks with small numbers of active nodes, since these configurations are most prone to unfairness caused by channel capture. Other aspects and advantages of the invention will become apparent from the following more detailed description, taken in conjunction with the accompanying drawings.

DESCRIPTION OF THE PREFERRED EMBODIMENTS

Figure 1:
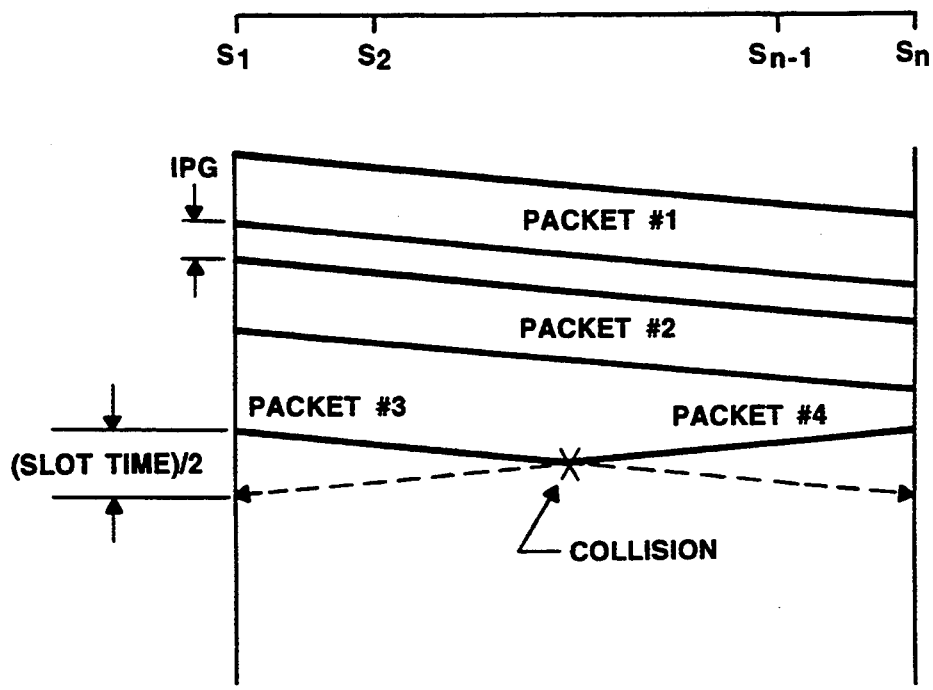
FIG. 1 is a diagram showing the principles of collision detection in a CSMA/CD LAN.

As shown in the drawings for purposes of illustration, the present invention is concerned with an improved technique for interpacket gap (IPG) intervals in a LAN that uses a network access protocol referred to as Carrier Sense Multiple Access with Collision Detection (CSMA/CD). Under the CSMA/CD rules for access to a network channel, any node wishing to transmit must first "listen" to make sure that the channel is idle before beginning to transmit. All nodes on the network have equal priority of access and may begin transmitting as soon as the channel is idle and a required inter-packet delay has elapsed.

FIG. 1 is a graphical diagram that is useful in visualizing channel access concepts in a LAN of the Ethernet or IEEE 802.3 standard type. The horizontal axis of the diagram represents distance along the channel from a first node $S_1$ on the left-hand side to an nth node $S_n$ on the right-hand side. The vertical axis represents time. The area designated Packet #1 represents the transmission of a data packet by node $S_1$ onto the channel. The vertical dimension of this area indicates that the packet takes a certain time for $S_1$ to transmit it. The downward slope of the area is consistent with the propagation delay associated with the packet as it is transmitted along the channel. Thus node $S_n$ receives the packet some time after it was transmitted.

After transmitting Packet #1, node $S_1$ waits for a required interpacket gap (IPG) time, which the standard defines as 9.6 μs, and if no other channel activity is detected, begins transmitting another packet, as indicated by the area "Packet #2." This is a back-to-back transmission of successive data packets, and thus far it has been assumed that there was no competition for access to the channel.

The next portion of FIG. 1 shows the effect of practically simultaneous transmission attempts from nodes $S_1$ and $S_n$. Transmission of Packets #3 and #4 were both started after the transmitting nodes detected an idle channel. The packets collide in mid-channel, as indicated diagrammatically in FIG. 1, and an indication of the collision is provided to the transmitting nodes, and to all the other nodes, as indicated by the broken lines in the figure. It will be appreciated from the figure that the time for node $S_1$ to learn of the collision is the round-trip propagation time from the transmitting node to the collision point, and back. It will also be appreciated that the collision point may be almost at the other end of the channel, adjacent to node $S_n$. Then the delay in learning of the collision would be the round-trip propagation time from one end of the channel to the other. This time is referred to as one slot time, and is defined by the IEEE 802.3 standard as a maximum of 51.2 μs.

In the event of a collision, each active node defers its next attempt to transmit by a random time that is an integral multiple r of the slot time. Specifically, for the nth attempt at retransmission r is chosen to from the range:

$0 \leq r < 2^k$, where k=min (n, 10).

Therefore, the backoff time is selected from the following ranges of times, depending on how many retransmission attempts have been made:

| attempt no. n | Retransmission Backoff time in slot times r (selected at random from:) |
| --- | --- |
| 1 | 0, 1 |
| 2 | 0, 1, 2, 3 |
| 3 | 0, 1, 2, 3, 4, 5, 6, 7 |
| 4 | 0 through 15 |
| n | 0 through ($2^n$−1) |
| 10 (maximum n) | 0 through 1,023 |

The standard backoff algorithm is designed to achieve optimal performance, in throughput, latency and fairness, when the number of nodes in the network is relatively large. When the number of active nodes, i.e. nodes having data packets to transmit, is small, e.g. two nodes, the IEEE 802.3 standard exhibits an undesirable effect referred to as the capture effect, in which one of the nodes may effectively capture the channel and transmit a succession of data packets in a back-to-back fashion for a relatively long period of time. The capture effect arises because the range of backoff times increases exponentially with the number of retransmission attempts. If one of two active nodes loses channel access, the losing node has a progressively decreasing probability of gaining access so long as the other node continues to transmit back-to-back packets.

Figure 2:
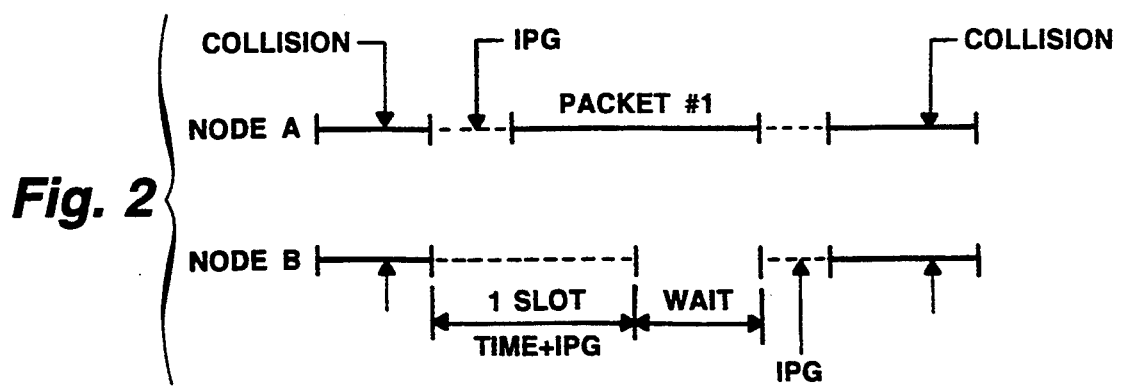
FIG. 2 is a diagram illustrating the use of a standard interpacket gap (IPG) interval.

FIG. 2 shows how the requirement for a fixed IPG interval can also work an unfairness in the channel capture situation. Nodes A and B are first contending for channel access, before channel capture may be said to have occurred, and it is assumed that both nodes have messages ready to transmit. Upon a collision between nodes A and B, each will select a backoff time at random between 0 and 1 slot times. If both select the same backoff time, both will begin retransmitting at the same time and there will be another collision. But if one node (say node A) selects a zero backoff time and node B selects one slot time for backoff, then node A will "win" access to the channel, since it can begin retransmitting after waiting for the IPG interval to pass (after the collision has been resolved and the channel becomes idle.). Node B waits one slot time, then must wait for an idle channel, since node A has begun retransmission.

At the end of node A's successful attempt at retransmission, both nodes will wait for the required IPG interval and begin transmitting again. There will be an inevitable collision and a resulting selection of backoff times, which now strongly favors the channel-capturing node (A). When A begins to transmit the second packet, it collides with B transmitting its first packet on its second attempt. Both the nodes will collide. Because of the different numbers of retransmission attempts for the two nodes (for the packet currently being processed), node A is more likely to win the collision resolution. This results in node A being able to successfully transmit a second packet and hence gain an advantage over node B, which is the unfairness inherent in the channel capture effect.

In accordance with the present invention, the transmit-to-transmit IPG interval is controlled in a manner that reduces the number of collisions between a channel-capturing node and another node, and increases fairness of access in channel capture situations. Basically, the method of the invention senses that a node has captured the channel, and then progressively increases the IPG interval for the capturing node (up to a maximum value) until another node has successfully transmitted a packet of data.

Figure 3:
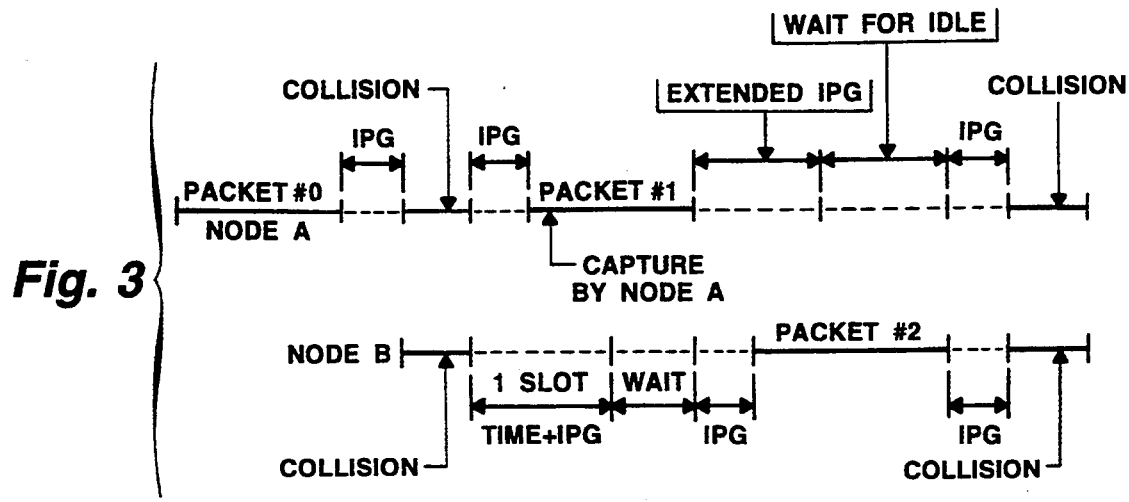
FIG. 3 is a diagram illustrating the principles of the present invention.

FIG. 3 shows diagrammatically how increasing the IPG interval for a node that has captured the channel can operate to yield the channel to another node. In this example, it is assumed that node A has already successfully transmitted a packet, referred to as packet #0. Nodes A and B then contend for the channel and, after a collision, node A backs off zero and node B backs off one slot time. Node A wins access to the channel and begins transmitting another packet.

Channel capture occurs when a node transmits a first packet (such as packet #0), then contends successfully for channel access, i.e. wins access after a collision, and then successfully transmits a second packet (such as packet #1), without there being any intervening transmission by another node. In this context, the expression "successfully transmits" means the transmission of a large enough portion of a packet to ensure that no collision will occur during the remainder of the transmission. For any two nodes in the network, there is a "collision window," measured by the propagation time from one node to the other, and back again. For two nodes at opposite ends of the network, the collision window is equal to or less than one slot time. Therefore, as soon as a slot time has elapsed from the beginning of the transmission of packet #1, node A can consider itself to have captured the channel.

After node B's backoff time has expired, it must wait until the channel is idle, i.e. must wait until A's transmission is complete. Normally at this point, both nodes would wait for the standard IPG interval of 9.6 μs. In accordance with the invention, node A, having recognized that it has captured the channel, waits for an extended IPG interval. Node B, at the end of its 9.6 μs IPG interval, finds the channel still idle and begins transmitting a data packet. Node A completes its extended IPG interval, but now finds the channel busy and must wait for the idle channel at the end of node B's transmission. At this point, neither node is in the capture mode of operation. Node A gives up its capture status when the channel is yielded to node B for the transmission of packet #2, and node B has not fulfilled the conditions necessary to declare capture. Therefore, both nodes wait for the standard 9.6 μs IPG interval before again contending for the channel.

The minimum time that the channel-capturing node must extend its IPG interval in order to yield the channel to another node is dependent on the relative spacing of the two nodes on the network. In the example, node B cannot begin transmitting until 9.6 μs after it senses the end of node A's transmission, regardless of the channel propagation delay. Then the "leading edge" of node B's transmission must propagate back to node A prior to the expiration of node A's extended IPG interval. Therefore, the extended IPG must be at least equivalent to the round-trip propagation time between the two nodes. If the nodes are spaced apart by the maximum network segment length permitted under the IEEE standard, the extended IPG would have to be equivalent to one slot time to guarantee access by the non-capturing node. However, always increasing the transmit-to-transmit IPG interval by this amount in the case of capture would reduce throughput performance for nodes that happened to be more closely spaced. Since there is no convenient way to determine how far apart two active nodes are, a compromise is used in the invention. The transmit-to-transmit IPG interval for a channel-capturing node is progressively increased after each collision, until the other node can successfully transmit, or until a maximum IPG interval of 51.2 μs is reached, which should also result in a successful transmission by the other node.

Any convenient scheme for progressively increasing the IPG interval may be employed. For example, the IPG interval can be increased in steps of 10 μs until the maximum interval is reached.

Figure 4:
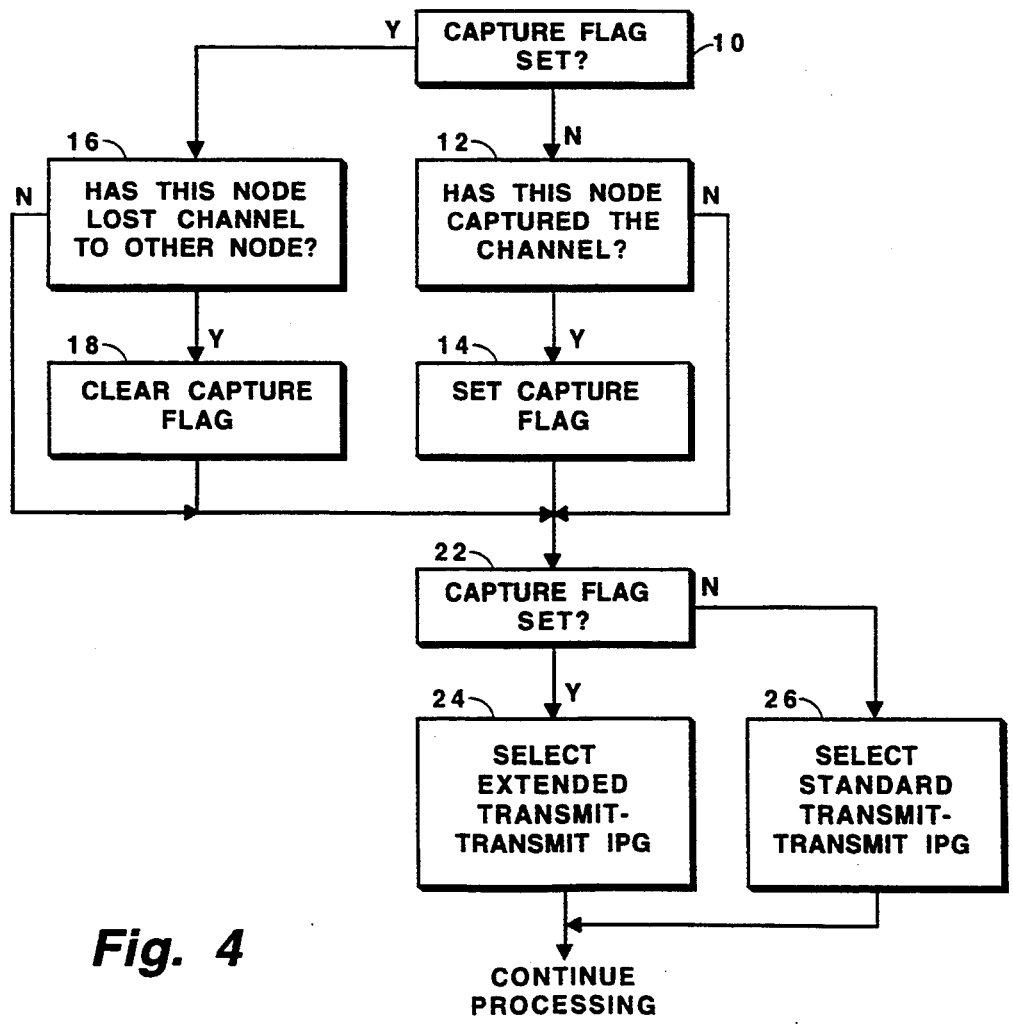
FIG. 4 is a flowchart showing the principles of the present invention.

FIG. 4 is a flowchart showing the functions performed in each node implementing this improved feature. The functions shown in the flowchart are performed prior to completion of a packet transmission, to determine whether the standard or extended IPG interval should be subsequently used. The node continually monitors its operation to determine whether it has captured the channel, and maintains a capture flag to record this status. Channel capture is defined to have occurred after a node transmits a first packet, then wins access to the channel after a collision, and then successfully transmits a second packet, without any intervening transmission by another node.

Figure 5:
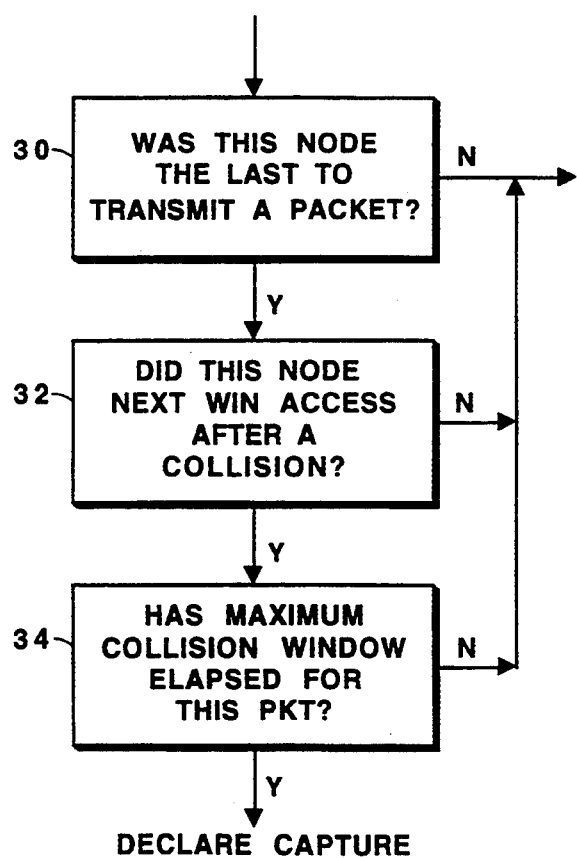
FIG. 5 is a flowchart specifying a test for channel capture in more detail.

As indicated in block 10, if this node currently does not have its capture flag set, a check is made (block 12) to determine if the node has captured the channel, in accordance with the definition set forth in the preceding paragraph, and as further illustrated in FIG. 5. If this node is determined to have captured the channel, the capture flag is set, as indicated in block 14. If the capture flag was set, a check is made to determine whether this node has lost access to the channel, as indicated in block 16. If so, the capture flag is cleared, as indicated in block 18.

Following these steps to maintain the capture flag, the capture flag is again checked, in block 22. If it is set, a less aggressive, i.e. longer, transmit-to-transmit IPG interval is selected, as indicated in block 24 and further specified in FIG. 6. If the capture flag is not set, the standard IPG interval is used, as indicated in block 26. After selection of the expanded IPG and a backoff time, if after a collision, the node waits while satisfying the backoff time and the selected IPG interval, before attempting to transmit a data packet. It will be understood, of course, that other forms of processing take place in the node, but these have been omitted for clarity.

FIG. 5 shows in more detail a test for whether a node has captured the channel. If this node was the last to transmit a packet, as determined in block 30, and then wins in a subsequent contention for the channel, as determined in block 32, it will be considered to have captured the channel as soon as a sufficient amount of a second packet has been transmitted to ensure that no further collision will take place, as determined in block 34. All three conditions must be satisfied before channel capture is declared. Thus, if there is an intervening transmission by another node, or if this node lost after a collision, or if the collision window has not elapsed during the transmission of the second packet, then channel capture is not declared.

Figure 6:
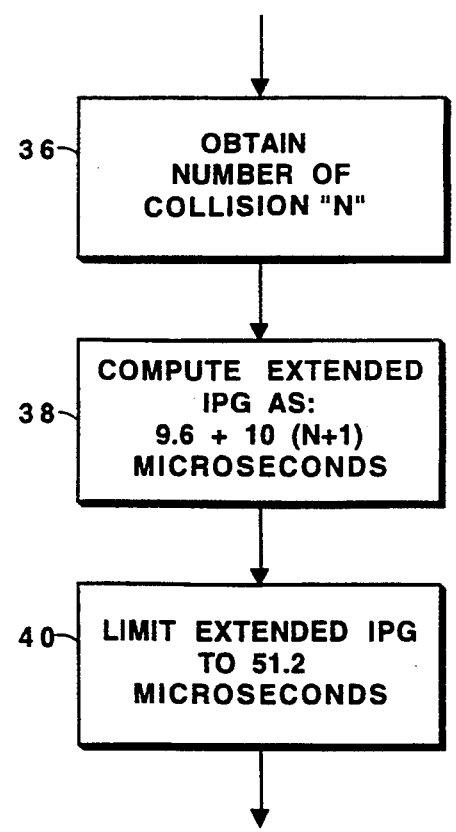
FIG. 6 is a flowchart specifying the selection of an extended transmit-transmit IPG in more detail.

FIG. 6 shows in more detail how the extended IPG interval is computed. The node obtains, as indicated in block 36, the current value of a collision counter (which is the same as the retransmission attempt number in the table above) then computes (as indicated in block 38) the extended IPG as a linearly increasing value given by $9.6 + 10(N+1)$ μs, where N is the number of collisions experienced for this packet. The value is limited to a maximum of 51.2 μs, as indicated in block 40.

The invention allows nodes in a CSMA/CD network to have improved performance when the network has only a small number of active nodes. The invention is becoming of increasing usefulness because there appears to be a trend toward LAN segments having fewer nodes, to provide more bandwidth to users. These smaller networks are more likely to expose the capture effect, which results in performance degradation. The invention applies equally well to 100 Mbps CSMA/CD LANs and to 10 Mbps CSMA/CD LANs. Moreover, nodes implementing the invention interoperate without modification with nodes using the IEEE 802.3 standard for IPG intervals.

It will be appreciated from the foregoing that the present invention represents a significant advance in the field of CSMA/CD LANs. In particular, the invention provides for greatly improved fairness of access to a LAN channel when there is a small number of active nodes on the network. From a user standpoint, improved fairness also improves overall message throughput and latency. It will also be appreciated that, although an embodiment of the invention has been described in detail by way of example, various modifications may be made without departing from the spirit and scope of the invention. Accordingly, the invention should not be limited except as by the appended claims.

We claim:

1. For use in a node of a network employing a Carrier Sense Multiple Access with Collision Detection (CSMA/CD) protocol for channel access, a method for improving fairness of access to a channel, comprising the steps of:
   capturing the channel for successive transmissions by this node;
   sensing whether this node has captured the channel;
   if this node has not captured the channel, observing a prescribed transmit-to-transmit interpacket gap, IPG., after completing a transmission and before any attempt at transmitting or retransmitting a packer and
   after sensing capture of the channel, selecting an increased transmit-to-transmit interpacket gap, IPG, interval that must be observed before any attempt at transmitting or retransmitting a packet;
   whereby the increased IPG gives a node that has not captured the channel an increased likelihood of transmitting before this node and overcoming capture of the channel.

2. A method as defined in claim 1, wherein the step of sensing when this node has captured the channel includes:
   sensing when a first packet has been successfully transmitted by this node;
   after transmitting the first packet, and without any intervening successful transmission by another node, winning access to the channel again following a collision; and
   sensing when a second packet has been successfully transmitted by this node after winning access in the prior step.

3. A method as defined in claim 1, wherein:
   the method further comprises the step of detecting a collision between a transmission from this channel-capturing node and a transmission from another node; and
   the step of selecting an increased transmit-to-transmit IPG interval includes selecting a progressively larger interval than the one previously selected, after each collision detected following a successful transmission by this channel-capturing node.

4. A method as defined in claim 3, wherein:
   the step of selecting a progressively larger IPG interval includes increasing the IPG interval in equal steps until a maximum value equal to one slot time is reached, where the slot time is the time needed to propagate a signal from one end of the network to the other, and back.

5. A method as defined in claim 1, and further comprising the step of:
   sensing when another node has successfully transmitted a packet and reverting to use of the prescribed transmit-to-transmit IPG interval.

6. For use in a node of a network employing a Carrier Sense Multiple Access with Collision Detection (CSMA/CD) protocol for channel access, apparatus for improving fairness of access to a channel, comprising:
   means for sensing when this node has captured the channel for successive transmissions by this node;
   means operative if this node has not captured the channel, for selecting a prescribed transmit-to-transmit interpacket gap, IPG, interval after completing a transmission and before any attempt at transmitting or retransmitting a packet; and
   means operative after sensing capture of the channel, for selecting an increased transmit-to-transmit interpacket gap, IPG, interval that must be observed before any attempt at transmitting or retransmitting a packet;
   whereby the increased IPG gives a node that has not captured the channel an increased likelihood of transmitting before this node and overcoming capture of the channel.

7. Apparatus as defined in claim 6, wherein the means for sensing when this node has captured the channel includes:
   means for sensing when a first packet has been successfully transmitted by this node;
   means operative after transmitting the first packet, and without any intervening successful transmission by another node, for sensing when this node wins access to the channel again following a collision; and
   means for sensing when a second packet has been successfully transmitted by this node after winning access to the channel following the collision.

8. Apparatus as defined in claim 6, wherein:
   the apparatus further comprises means for detecting a collision between a transmission from this channel-capturing node and a transmission from another node; and
   the means for selecting an increased transmit-to-transmit IPG interval includes means for selecting a progressively larger interval than the one previously selected, after each collision detected following a successful transmission by this channel-capturing node.

9. Apparatus as defined in claim 8, wherein:
   the means for selecting a progressively larger IPG interval includes means for increasing the IPG interval in equal steps until a maximum value equal to one slot time is reached, where the slot time is the time needed to propagate a signal from one end of the network to the other, and back.

10. Apparatus as defined in claim 6, and further comprising:
    means operable after channel capture, for sensing when another node has successfully transmitted a packet and reverting in this former channel-capturing node to use of the prescribed transmit-to-transmit IPG interval.

* * * * *